United States Patent
Borst et al.

(10) Patent No.: US 11,212,075 B2
(45) Date of Patent: Dec. 28, 2021

(54) METHOD AND APPARATUS FOR ACHIEVING A TARGET TRANSACTION RATE IN A BLOCKCHAIN NETWORK

(71) Applicant: NOKIA SOLUTIONS AND NETWORKS OY, Espoo (FI)

(72) Inventors: Simon Borst, Maplewood, NJ (US); Anwar Walid, Watchung, NJ (US)

(73) Assignee: Nokia Technologies Oy, Espoo (FI)

(*) Notice: Subject to any disclaimer, the term of this patent is extended or adjusted under 35 U.S.C. 154(b) by 599 days.

(21) Appl. No.: 15/937,505

(22) Filed: Mar. 27, 2018

(65) Prior Publication Data
US 2019/0305931 A1    Oct. 3, 2019

(51) Int. Cl.
*H04L 9/06* (2006.01)

(52) U.S. Cl.
CPC .......... *H04L 9/0637* (2013.01); *H04L 9/0643* (2013.01); *H04L 2209/38* (2013.01)

(58) Field of Classification Search
CPC .............................. H04L 2209/38; G06F 16/27
See application file for complete search history.

(56) References Cited

U.S. PATENT DOCUMENTS

| 10,361,853 B2* | 7/2019 | Castagna | H04L 9/3247 |
| 10,558,996 B2* | 2/2020 | Boutelle | G06Q 30/0229 |
| 2016/0028552 A1 | 1/2016 | Spanos et al. | |
| 2018/0270058 A1* | 9/2018 | Watanabe | H04L 9/3297 |
| 2019/0036957 A1* | 1/2019 | Smith | H04L 63/101 |

FOREIGN PATENT DOCUMENTS

| CN | 107067242 A | 8/2017 |
| WO | 2017091530 A1 | 6/2017 |

OTHER PUBLICATIONS

Croman, et al., "On Scaling Decentralized Blockchains", (https://www.tik.ee.ethz.ch/file/74bc987e6ab4a8478c04950616612f69/main.pdf.) 20 pages.

Sompolinsky, et al., "Secure High-Rate Transaction Processing in Bitcoin", (https://eprint.iacr.org/2013/881.pdf). 31 pages.

* cited by examiner

*Primary Examiner* — Jay Huang
(74) *Attorney, Agent, or Firm* — Kramer Amado PC

(57) ABSTRACT

Various embodiments relate to a method and apparatus for achieving a target transaction rate, T, in a Blockchain network, the method including the steps of measuring and comparing a current transaction rate to the target transaction rate, T, and adjusting a difficulty-of-work parameter to achieve the target transaction rate, based upon a characterization of the target transaction rate T that is a function of a block size parameter for each of the plurality of blocks, B, a total number of nodes parameter, K, a hashing power per node parameter, h, a success probability parameter, p, an average block transfer delay parameter, $\delta_0$, and a block dissemination delay parameter, $\Delta^*S(K)$.

25 Claims, 2 Drawing Sheets

METHOD AND APPARATUS FOR ACHIEVING A TARGET TRANSACTION RATE IN A BLOCKCHAIN NETWORK

TECHNICAL FIELD

This disclosure relates generally to a distributed data structure, namely, a blockchain, and more specifically, but not exclusively, to a framework for blockchain design and resource management.

BACKGROUND

Blockchain is a distributed data structure which gave rise to the cryptocurrency commonly referred to as Bitcoin. The blockchain achieves consensus about transactions in an asynchronous, open, peer-to-peer ("p2p") network.

Blockchain enabled the cryptocurrency Bitcoin to solve a problem that was not solved by any prior cryptocurrencies or distributed transaction systems, which is enabling trusted transactions across untrusted peers without any centralized trusted entity.

A blockchain is a distributed ledger maintained by the users of a system to validate and record a continuously generated set of transactions. Transactions are generated in the system, for example, by users or by other entities and are visible to all users. These transactions are grouped into blocks.

Each block comprises of a set of valid transactions and a link to a previous block.

Since these blocks are chained together by the link to the previously generated block, it is difficult to modify a block once it is recorded. This is because of the fact that any change in data in one block will result in a cascade of changes in all subsequent blocks. Unless a user has more computational power than the rest of the network (or there is collusion between a majority of the users), it is not possible to make changes in the portion of the blockchain that is far from the tip of the blockchain. Therefore, blockchains can be used as a permanent, verifiable ledger for recording transactions.

Before the distributed data structure of blockchain was used, it was assumed that no asynchronous, consensus protocol could operate in the presence of faults.

It was also assumed that a distributed system could choose only two out of three properties, namely: consistency, availability and partition tolerance. The blockchain upended both assumptions by working with a probabilistic notion of consistency that was much weaker than consistency models previously used.

SUMMARY

A brief summary of various embodiments is presented below. Embodiments address a method and apparatus for achieving a target transaction-handling capacity of a blockchain (i.e., long term overall growth rate) in the presence of processing delay in the blockchain.

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments described herein relate to a method for achieving a target transaction rate, T, in a Blockchain network, the method including the steps of measuring and comparing a current transaction rate to the target transaction rate, T, and adjusting a difficulty-of-work parameter to achieve the target transaction rate, based upon a characterization of the target transaction rate T that is a function of a block size parameter for each of the plurality of blocks, B, a total number of nodes parameter, K, a hashing power per node parameter, h, a success probability parameter, p, an average block transfer delay parameter, $\delta_0$, and a block dissemination delay parameter, ☐ *S(K).

In an embodiment of the present disclosure, the method for achieving the target transaction rate, T, in the Blockchain network, further including receiving the block size parameter for each of a plurality of blocks, the block size being a number of transaction records in each of the plurality of blocks, receiving the total number of nodes parameter, in the Blockchain network, receiving the hashing power per node parameter, the hashing power being a number of hashing operations per time unit, receiving the success probability parameter, the success probability being a hashing operation resulting in a hash value, receiving the average block transfer delay parameter for each of the plurality of blocks, and determining the block dissemination delay parameter, depending on a block dissemination delay mechanism.

In an embodiment of the present disclosure, the target transaction rate is calculated by: $T=BKhp(1-hpB\delta_0 S(K))$ In an embodiment of the present disclosure, the success probability parameter does not depend on the block size parameter for each of the plurality of blocks.

In an embodiment of the present disclosure, the average block transfer delay parameter is proportional to the block size parameter for each of the plurality of blocks.

In an embodiment of the present disclosure, the average block transfer delay parameter is: $\delta=B\delta_0$ In an embodiment of the present disclosure, the target transaction rate is calculated by: $T=KR(1-R\delta_0 S(K))$ In an embodiment of the present disclosure, $R=Bhp$, where R is a rate of transactions handled per node parameter.

In an embodiment of the present disclosure, the block size parameter for each of a plurality of blocks, the hashing power per node parameter and the success probability parameter are adjusted without affecting the target transaction rate while maintaining a constant value for the product of the block size parameter for each of a plurality of blocks, the hashing power per node parameter and the success probability parameter.

In an embodiment of the present disclosure, a target rate of transactions handled per node, $R_{target}$, is calculated by:

$$R_{target} = \frac{1-\sqrt{1-4T_{target}\delta_0 S(K)/K}}{2\delta_0 S(K)}$$

In an embodiment of the present disclosure, the difficulty-of-work parameter is adjusted by multiplying with the ratio of R and $R_{target}$.

Various embodiments described herein relate to a Blockchain performance controller configured to achieve a target transaction rate, T, in a Blockchain network, the controller including a memory; and a processor configured to measure and compare a current transaction rate to the target transaction rate, T, and adjust a difficulty-of-work parameter to achieve the target transaction rate, based upon a characterization of the target transaction rate T that is a function of a block size parameter for each of the plurality of blocks, B, a total number of nodes parameter, K, a hashing power per node parameter, h, a success probability parameter, p, an average block transfer delay parameter, $\delta_0$, and a block dissemination delay parameter, $\Box *S(K)$.

In an embodiment of the present disclosure, the Blockchain performance controller configured to achieve the target transaction rate, T, in the Blockchain network, the controller further including the processor configured to receive the block size parameter for each of a plurality of blocks, the block size being a number of transaction records in each of the plurality of blocks, receive the total number of nodes parameter, in the Blockchain network, receive the hashing power per node parameter, the hashing power being a number of hashing operations per time unit, receive the success probability parameter, the success probability being a hashing operation resulting in a hash value, receive the average block transfer delay parameter for each of the plurality of blocks, and determine the block dissemination delay parameter, depending on a block dissemination delay mechanism.

In an embodiment of the present disclosure, the target transaction rate is calculated by: $T=BKhp(1-hpB\delta_0S(K))$ In an embodiment of the present disclosure, the success probability parameter does not depend on the block size parameter for each of the plurality of blocks.

In an embodiment of the present disclosure, the average block transfer delay parameter is proportional to the block size parameter for each of the plurality of blocks.

In an embodiment of the present disclosure, the average block transfer delay parameter is: $\delta=B\delta_0$ In an embodiment of the present disclosure, the target transaction rate is calculated by: $T=KR(1-R\delta_0S(K))$ In an embodiment of the present disclosure, $R=Bhp$, where R is a rate of transactions handled per node parameter.

In an embodiment of the present disclosure, the block size parameter for each of a plurality of blocks, the hashing power per node parameter and the success probability parameter are adjusted without affecting the target transaction rate while maintaining a constant value for the product of the block size parameter for each of a plurality of blocks, the hashing power per node parameter and the success probability parameter.

In an embodiment of the present disclosure, the target rate of transactions handled per node parameter, $R_{target}$, is calculated by:

$$R_{target} = \frac{1-\sqrt{1-4T_{target}\delta_0S(K)/K}}{2\delta_0S(K)}$$

In an embodiment of the present disclosure, the difficulty-of-work parameter is adjusted by multiplying with the ratio of R and $R_{target}$.

Various embodiments described herein relate to a computer program product comprising a computer readable storage medium having computer readable program code embodied in the medium, the computer program product including program code for measuring and comparing a current transaction rate to the target transaction rate, T, and program code for adjusting a difficulty-of-work parameter to achieve the target transaction rate, based upon a characterization of the target transaction rate T that is a function of a block size parameter for each of the plurality of blocks, B, a total number of nodes parameter, K, a hashing power per node parameter, h, a success probability parameter, p, an average block transfer delay parameter, $\delta_0$, and a block dissemination delay parameter, $\Box *S(K)$.

In an embodiment of the present disclosure, the program code product, further including the computer program product including program code for receiving the block size parameter for each of a plurality of blocks, the block size being a number of transaction records in each of the plurality of blocks, program code for receiving the total number of nodes parameter, in the Blockchain network, program code for receiving the hashing power per node parameter, the hashing power being a number of hashing operations per time unit, program code for receiving the success probability parameter, the success probability being a hashing operation resulting in a hash value, program code for receiving the average block transfer delay parameter for each of the plurality of blocks, and program code for determining the block dissemination delay parameter, depending on a block dissemination delay mechanism.

In an embodiment of the present disclosure, the target transaction rate is calculated by: $T=BKhp(1-hpB\delta_0S(K))$

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims, and explain various principles and advantages of those embodiments.

These and other more detailed and specific features are more fully disclosed in the following specification, reference being had to the accompanying drawings, in which.

DETAILED DESCRIPTION

Figure 1:
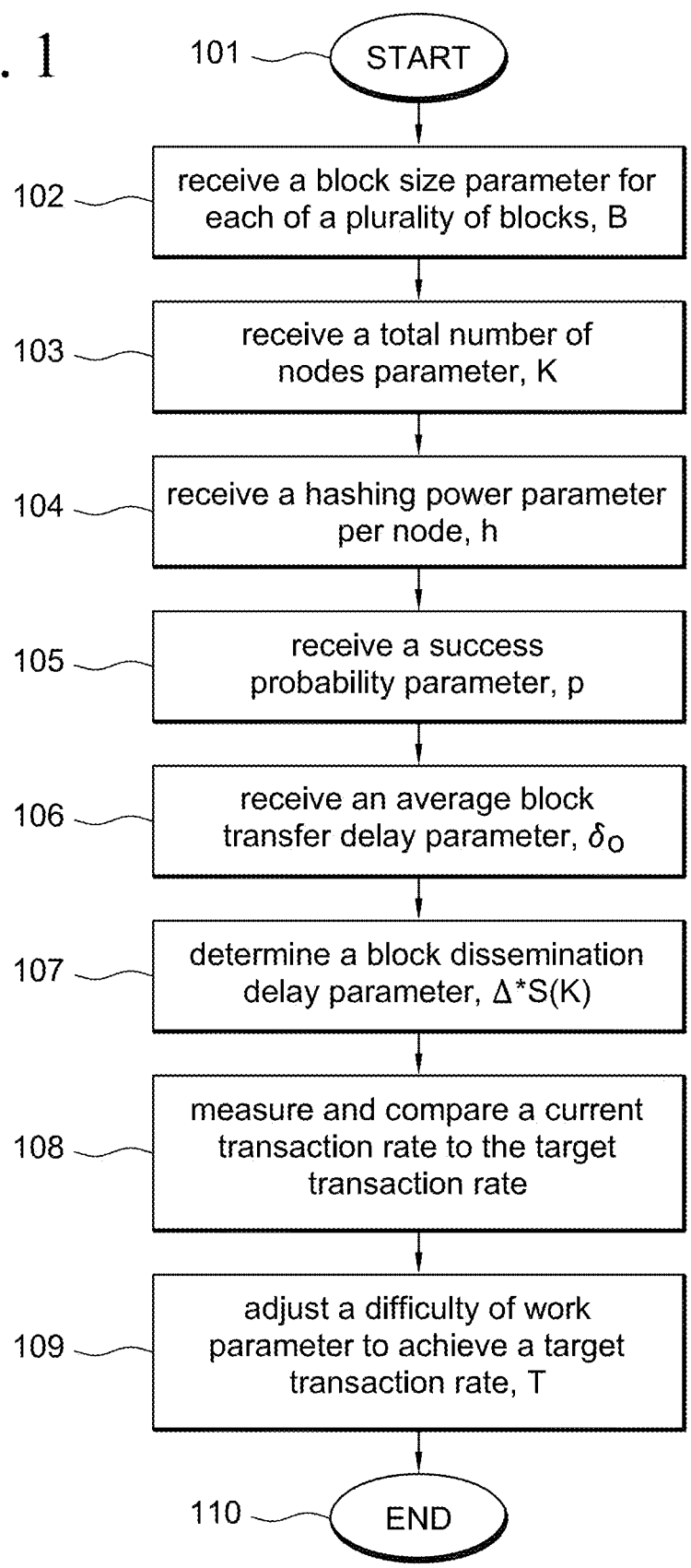
FIG. 1 illustrates a flow diagram for adjusting parameters in a Blockchain network to achieve a target block generation rate of the current embodiment.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

As described above, the cryptocurrency Bitcoin and the underlying blockchain technology has sparked interest in using the blockchain for other applications beyond cryptocurrencies that require a distributed and secure transactions ledger.

However, there are many shortcomings in the operation of Blockchain technology which will be addressed by the following embodiments described below. For example, using Blockchain technology in other applications (e.g., IoT). In private blockchains, access to system parameters allows for adjustments to be made to make the blockchain more efficient It is known that the overall growth rate of the common ledger in these cryptocurrency systems is low and often falls below the desired transaction-handling capacity. While there may be rules-of-thumb available for setting confirmation thresholds in Blockchain networks, these fail to account for delays in the system.

Blockchain technology provides a mechanism for establishing trust and consensus in distributed environments. Blockchain technology may be applied to different kinds of information records or transactions which may be managed and stored in a Blockchain.

As Blockchain networks evolve to industrial deployment with increasing numbers of distributed nodes, block transfer and processing delays arise as a critical issue which may negatively affect the overall growth rate of the common ledger and create potential vulnerability to adversarial attacks.

The overall growth rate provides a measure for the transaction-handling capacity and scalability of the Blockchain network and is becoming an important metric in large-scale commercial deployment of Blockchain networks.

The Blockchain network must be resilient against possible adversarial attacks and other security threats which are critical to ensuring the integrity of the information records stored in a Blockchain network, especially in applications that involve business transactions, financial or medical data, or personal or public safety.

Therefore, these embodiments address the problem of how to design and manage a Blockchain network platform to achieve a target block generation rate in the presence of delays.

The present embodiments provide a framework for adjusting specific parameters such as the difficulty of the proof-of-work ("PoW").

Block transfer and processing delays arise when Blockchain networks evolve to industrial deployment scenarios with increasing numbers of distributed nodes.

Nodes of a Blockchain share an identical view of the common ledger, as a sequence of chained blocks, but may also include individual branches with newly generated or obtained blocks beyond the common ledger for which no global consensus has been reached yet.

The delays in transferring blocks among the nodes and the subsequent processing may cause more frequent inconsistencies between the branches and create forks, which lead to wastage of resources and slow down the overall growth rate of the common ledger.

The wastage of resources and slow down of the overall growth rate may be countered by lowering the difficulty of the PoW in the hashing calculations (required in order to generate a single block), but by lowering the PoW, the degree of data protection is reduced.

The current embodiment addresses the problem of how to adjust the difficulty of the PoW in the presence of delays, to achieve a target transaction-handling capacity of a Blockchain in terms of the long-term overall block generation rate.

The current embodiment addresses the problem by creating a relationship between the block success rate of individual nodes, the total number of nodes in the system, the block transfer and processing delay between a pair of nodes, and the transaction-handling capacity of the system in terms of the overall growth rate of the common ledger.

The block success rate is determined by the hashing power of the individual nodes (i.e., the number of hashing operations that can be performed given their computational power) in conjunction with the difficulty of the PoW (i.e., the probability of a success given the required number of leading zeros in the hashing value).

The wastage coefficient, which captures the expected number of redundant blocks generated for each block that is included in the common ledger and reaches finality, depends on the dissemination mechanism used in transferring blocks among the various nodes (e.g., in a pure peer-to-peer manner or in a more controlled manner).

In the current embodiment, the relationship is applied for a given dissemination mechanism and total number of nodes in the system, to provide estimates for any of the relevant performance metrics or required system parameters given measurements or target values of the other relevant variables.

The relationship provides a systematic assessment of relevant performance trade-offs and provides a convenient framework for customized Blockchain design and resource management in various deployment scenarios.

The relationship which determines the long-term growth rate of the ledger may be expressed as:

$$\gamma = K\lambda_0(1-\lambda_0 \delta S(K))$$

Where K is defined as the total number of (homogenous) nodes.

Where $\gamma$ is defined as the long-term growth rate of the ledger.

Where $\lambda_0$ is equal to $1/\tau$ which is the block generation rate per node, where $\tau$ is defined as the average block completion time per node.

Where $\delta$ is defined as the average block transfer delay.

Where $\delta*S(K)$ represents the total delay incurred in dissemination of a block among all K nodes, for example, where $S(K)=\sum_{k=1}^{K-1} 1/k$ or $S(K)=K-1$, depending on whether the block dissemination delay mechanism is epidemic or controlled.

The relationship is correct assuming the wastage fraction, which is defined as $\lambda_0 \delta S(K)$ is below a threshold, $\epsilon$.

These parameters may be expressed in terms of specific operational control or design parameters. For example, the block generation rate per node may be expressed as: $\lambda_0 = hp$.

Where h is defined as the hashing power per node (i.e., the number of hashing operations that can be performed per time unit).

Where p is defined as the success probability (i.e., the probability that a single hashing operation results in a hash value with the required number of leading zeros, as governed by the difficulty-of-work).

In order to convert the long-term growth rate, $\gamma$ (measured in blocks) into a transaction rate (in terms of transactions), parameter B for the block size measured in terms of the number of transaction records must be defined.

When the block size is varied in order to achieve optimal trade-offs, among various performance metrics, it is necessary to account for the effect of the block size on the other relevant parameters. Therefore, the following two assumptions are made.

The success probability, p, hence the block generation rate $\lambda_0$ per node, does not depend on B, to first order.

The average block transfer delay $\delta$ is proportional to B, to first order.

The second assumption is reasonable for sufficiently large block sizes $B \geq B_{min}$, where the transfer delay is mainly determined by the throughput capacity provided by the underlying network, rather than the sheer physical link latency.

The average block transfer delay may then be related to the block size as:

$$\delta = B\delta_0$$

Where $\delta_0$ is defined as the average transfer delay for a block of unit size (e.g., 1000 transactions)

Therefore, by substituting the above equations into the formula, the overall transaction rate may be expressed as:

$$T = BKhp(1 - hpB\delta_0 S(K)) = KR(1 - R\delta_0 S(K)),$$

Where R=Bhp is defined as the rate of transactions handled per node (which may however not all get included in the main ledger and thus only partly contribute to the overall transaction rate).

Therefore, the overall transaction rate T only depends on the block size B, hashing power per node h and success probability p (as a proxy for the difficulty-of-work) through their product R.

These three parameters may be varied in order to optimize trade-offs among other performance metrics without effecting the transaction rate, as long as their product is kept fixed.

For given K and $\delta_0$, a target transaction rate $T_{target}$ can be achieved for $$R_{target} = \frac{1 - \sqrt{1 - 4T_{target}\delta_0 S(K)/K}}{2\delta_0 S(K)},$$

Assuming that $$T_{target} \leq \frac{K}{4\delta_0 S(K)}$$

and that transaction rates higher than $$\frac{K}{4\delta_0 S(K)}$$

cannot be achieved.

If the block size B and the measured current value μ of the block generation rate per node $\lambda_0$=hp are known, then $R_{target}$ may be achieved by adjusting the difficulty-of-work parameter p by a factor $R_{target}/(B\mu)$, or modifying the block size by that factor, or any joint adaptation of the difficulty-of-work parameter p and the block size B, to adjust their product by that factor.

FIG. 1 illustrates a flow diagram for a method 100 for adjusting a transaction rate, T, in a Blockchain network.

The step of receiving a parameter may be defined as receiving the parameter, have prior knowledge of the parameter, may obtain the parameter from a database or may use any known methods of receiving or obtaining a parameter.

The method 100 begins at step 101.

The method 100 then proceeds to step 102 which receives a block size parameter for each of a plurality of blocks, B, the block size being a number of transaction records in each of the plurality of blocks.

The method 100 then proceeds to step 103 which receives a total number of nodes parameter, K, in the Blockchain network.

The method 100 then proceeds to step 104 which receives a hashing power per node parameter, h, the hashing power being a number of hashing operations per time unit.

The method 100 then proceeds to step 105 which receives a success probability parameter, p, the success probability parameter being a hashing operation resulting in a hash value.

The method 100 then proceeds to step 106 which receives an average transfer delay parameter for each of the plurality of blocks, $\delta_0$.

The method 100 then proceeds to step 107 which determines a block dissemination delay parameter, ☐*S(K), depending on a block dissemination delay mechanism.

The method 100 then proceeds to step 108 which measures and compares a current transaction rate to the target transaction rate.

The method 100 then proceeds to step 109 which adjusts a difficulty-of-work parameter to achieve a target transaction rate, T, based upon a characterization of the transaction rate T that is a function of the block size parameter for each of the plurality of blocks, the total number of nodes parameter, the hashing power per node parameter, the success probability parameter, the average block transfer delay parameter, and the block dissemination delay parameter.

The method 100 then ends at step 110.

Figure 2:
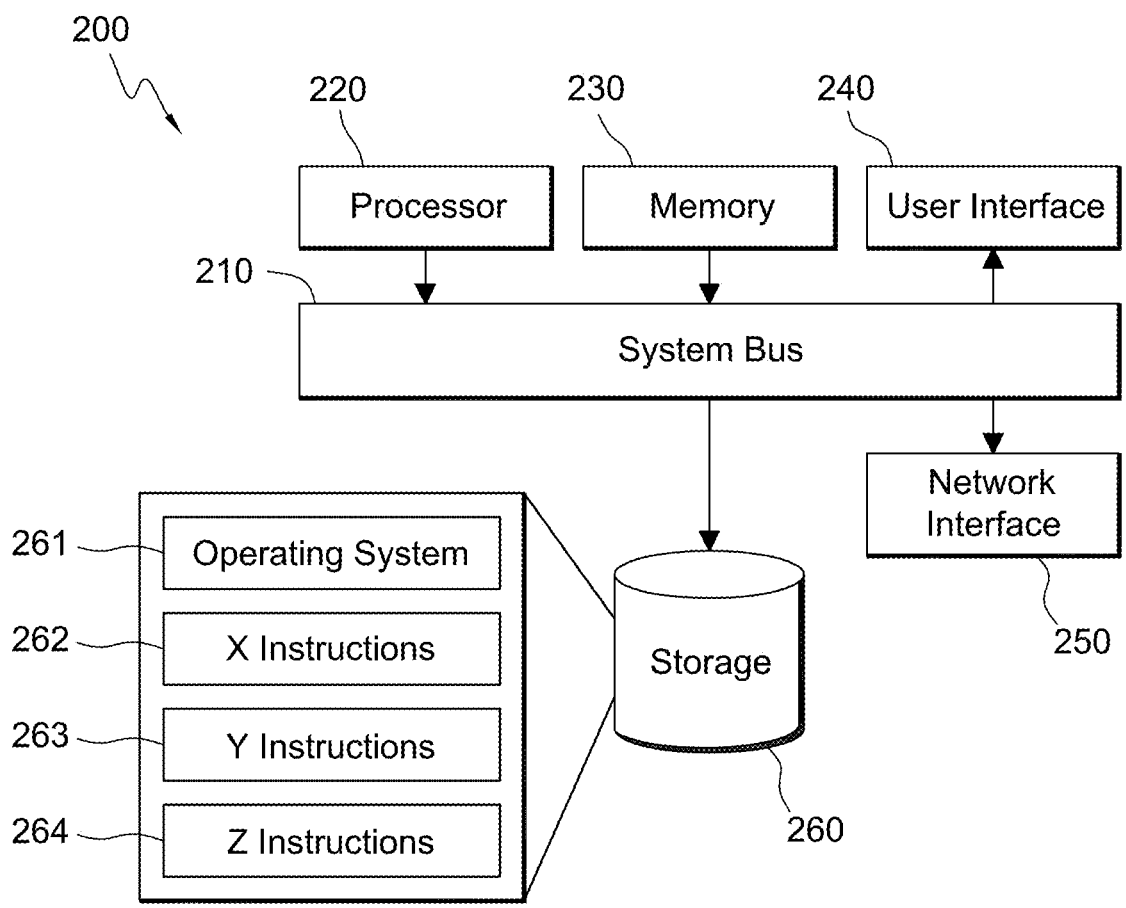
FIG. 2 illustrates a block diagram of a real-time data processing system of the current embodiment.

FIG. 2 illustrates an exemplary hardware diagram 200 for implementing a load distributor device or a server. The exemplary hardware 200 may correspond to one or more load balancers 120 or servers 130 of FIG. 1. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of compensating for delays in a Blockchain network having a plurality of nodes, the method comprising:
    determining a block success rate based upon a hashing power per node parameter h of individual nodes in the Blockchain network;
    determining a long-term growth rate of a common ledger for the Blockchain network based upon a block dissemination delay parameter, $\delta^*(K)$;
    measuring and comparing a current transaction rate to the target transaction rate, T, and
    adjusting a difficulty-of-work parameter PoW to achieve the target transaction rate T, based upon a characterization of the target transaction rate T related to a block size parameter for each of the plurality of blocks, B, a total number of nodes parameter, K, the hashing power per node parameter, h, a success probability parameter, p, an average block transfer delay parameter, $\delta_0$, and the block dissemination delay parameter, $\delta^*S(K)$, wherein the difficulty-of-work parameter PoW is lowered to decrease delays among the plurality of nodes in the Blockchain network.

2. The method of claim 1, further comprising:
receiving the block size parameter B for each of a plurality of blocks, B being a number of transaction records in each of the plurality of blocks;
receiving the total number of nodes parameter K, in the Blockchain network;
receiving the hashing power per node parameter h as a number of hashing operations per time unit;
receiving the success probability parameter p, the success probability parameter p being a hashing operation resulting in a hash value;
receiving the average block transfer delay parameter $\delta_0$ for each of the plurality of blocks, and
determining the block dissemination delay parameter $\delta^*S(K)$, depending on a block dissemination delay mechanism.

3. The method of claim 1, further comprising:
calculating the target transaction rate T by:

$$T=BKhp(1-hpB\delta_0 S(K)).$$

4. The method of claim 2, wherein the success probability parameter p does not depend on the block size parameter B for each of the plurality of blocks.

5. The method of claim 2, wherein the average block transfer delay parameter, $\delta_0$ is proportional to the block size parameter B for each of the plurality of blocks.

6. The method of claim 2, wherein the average block transfer delay parameter $\delta_0$ is defined as an average transfer delay for a block of unit size.

7. The method of claim 2, further comprising:
calculating the target transaction rate T by:

$$T=KR(1-R\delta_0 S(K)).$$

8. The method of claim 7, wherein R=Bhp, where R is a rate of transactions handled per node.

9. The method of claim 7, wherein the block size parameter B for each of a plurality of blocks, the hashing power per node parameter h and the success probability parameter p are adjusted without affecting the target transaction rate T while maintaining a constant value for a product of the block size parameter B for each of a plurality of blocks, the hashing power per node parameter h and the success probability parameter p.

10. The method of claim 8, wherein a target rate of transactions handled per node, $R_{target}$, is calculated by:

$$R_{target} = \frac{1-\sqrt{1-4T_{target}\delta_0 S(K)/K}}{2\delta_0 S(K)}.$$

11. The method of claim 10, wherein the difficulty-of-work parameter is adjusted by multiplying with a ratio of R and $R_{target}$.

12. A Blockchain performance controller configured to compensate for delays in a Blockchain network having a plurality of nodes, the controller comprising:
a memory; and
a processor configured to:
determine a block success rate based upon a hashing power per node parameter h of individual nodes in the Blockchain network;
determine a long-term growth rate of a common ledger for the Blockchain network based upon a block dissemination delay parameter, $\delta^*S(K)$;
measure and comparing a current transaction rate to the target transaction rate, T, and
adjust a difficulty-of-work parameter PoW to achieve the target transaction rate T, based upon a characterization of the target transaction rate T related to a block size parameter for each of the plurality of blocks, B, a total number of nodes parameter K, the hashing power per node parameter, h, a success probability parameter, p, an average block transfer delay parameter, $\delta_0$, and the block dissemination delay parameter, $\delta^*S(K)$, wherein the difficulty-of-work parameter PoW is lowered to decrease delays among the plurality of nodes in the Blockchain network.

13. The Blockchain performance controller of claim 12, wherein the processor is further configured to:
receive the block size parameter B for each of a plurality of blocks, the block size being a number of transaction records in each of the plurality of blocks;
receive the total number of nodes parameter K, in the Blockchain network;
receive the hashing power per node parameter h as a number of hashing operations per time unit;
receive the success probability parameter p, the success probability parameter p being a hashing operation resulting in a hash value;
receive the average block transfer delay parameter $\delta_0$ for each of the plurality of blocks, and
determine the block dissemination delay parameter $\delta^*S(K)$, depending on a block dissemination delay mechanism.

14. The Blockchain performance controller of claim 12, wherein the target transaction rate T is calculated by:

$$T=BKhp(1-hpB\delta_0 S(K)).$$

15. The Blockchain performance controller of claim 12, wherein the success probability parameter p does not depend on the block size parameter B for each of the plurality of blocks.

16. The Blockchain performance controller of claim 12, wherein the average block transfer delay parameter $\delta_0$ is proportional to the block size parameter B for each of the plurality of blocks.

17. The Blockchain performance controller of claim 12, wherein the average block transfer delay parameter $\delta_0$ is defined as an average transfer delay for a block of unit size.

18. The Blockchain performance controller of claim 12, wherein the target transaction rate T is calculated by:

$$T=KR(1-R\delta_0 S(K)).$$

19. The Blockchain performance controller of claim 18, wherein R=Bhp, where R is a rate of transactions handled per node.

20. The Blockchain performance controller of claim 18, wherein the block size parameter B for each of a plurality of blocks, the hashing power per node parameter h and the success probability parameter p are adjusted without affecting the target transaction rate T while maintaining a constant value for a product of the block size parameter B for each of a plurality of blocks, the hashing power per node parameter h and the success probability parameter p.

21. The Blockchain performance controller of claim 19, wherein a target rate of transactions handled per node parameter, $R_{target}$, is calculated by:

$$R_{target} = \frac{1 - \sqrt{1 - 4T_{target}\delta_0 S(K)/K}}{2\delta_0 S(K)}.$$

22. The Blockchain performance controller of claim 21, wherein the difficulty-of-work parameter is adjusted by multiplying with a ratio of R and $R_{target}$.

23. A non-transitory computer readable storage medium having instruction stored thereon executable by a processor for compensating for delays in a Blockchain network having a plurality of nodes, the non-transitory computer readable storage medium comprising:
- instructions for determining a block success rate based upon hashing power per node parameter h of individual nodes in the Blockchain network;
- instructions for determining a long-term growth rate of a common ledger for the Blockchain network based upon a block dissemination delay parameter, $\delta^*S(K)$;
- instructions for measuring and comparing a current transaction rate to the target transaction rate, T, and
- instructions for adjusting a difficulty-of-work parameter PoW to achieve the target transaction rate T, based upon a characterization of the target transaction rate T related to of a block size parameter for each of the plurality of blocks, B, a total number of nodes parameter K, the hashing power per node parameter, h, a success probability parameter, p, an average block transfer delay parameter, $\delta_0$, and the block dissemination delay parameter, $\delta^*S(K)$, wherein the difficulty-of-work parameter PoW is lowered to decrease delays among the plurality of nodes in the Blockchain network.

24. The non-transitory computer readable storage medium of claim 23, further comprising:
- instructions for receiving the block size parameter B for each of a plurality of blocks, the block size being a number of transaction records in each of the plurality of blocks;
- instructions for receiving the total number of nodes parameter K, in the Blockchain network;
- instructions for receiving the hashing power per node parameter h as a number of hashing operations per time unit;
- instructions for receiving the success probability parameter p, the success probability parameter p being a hashing operation resulting in a hash value;
- instructions for receiving the average block transfer delay parameter $\delta_o$ for each of the plurality of blocks, and instructions for determining the block dissemination delay parameter $\delta^*S(K)$, depending on a block dissemination delay mechanism.

25. The non-transitory computer readable storage medium of claim 24, wherein the target transaction rate T is calculated by:

$$T = BKhp(1 - hpB\delta_0 S(K)).$$

* * * * *